United States Patent [19]

Sutton

[11] 3,880,641

[45] Apr. 29, 1975

[54] MATERIALS CONTAINING ANTI-CAKING POWDERS

[75] Inventor: Francis William Anthony Sutton, Cornwall, England

[73] Assignee: English Clays Lovering Pochin & Company Limited, St. Austell, Cornwall, England

[22] Filed: Oct. 13, 1972

[21] Appl. No.: 297,490

Related U.S. Application Data

[63] Continuation of Ser. No. 754,730, Aug. 22, 1968, abandoned.

[30] Foreign Application Priority Data

Aug. 30, 1967 United Kingdom............... 39633/67

[52] U.S. Cl........................... 71/30; 71/61; 71/64 E; 117/100 A; 117/169 R
[51] Int. Cl. ............................................... C05c 9/00
[58] Field of Search.............. 117/100 A, 169 R, 26; 71/59, 64 E, 30, 61

[56] References Cited
UNITED STATES PATENTS

| 3,041,159 | 6/1962 | Smith | 71/64 |
| 3,125,434 | 3/1964 | Smith et al. | 71/64 |
| 3,169,075 | 2/1965 | Morrow et al. | 117/100 |
| 3,325,276 | 6/1967 | Feller | 71/59 |

Primary Examiner—William D. Martin
Assistant Examiner—Dennis C. Konopacki
Attorney, Agent, or Firm—Stevens, Davis, Miller & Mosher

[57] ABSTRACT

A granular hygroscopic fertilizer coated at least partially with up to 3 percent by weight of a pulverized calcined kaolin having at least 40 percent by weight thereof particles smaller than 2 microns equivalent spherical diameter.

8 Claims, No Drawings

3,880,641

MATERIALS CONTAINING ANTI-CAKING POWDERS

This is a continuation of application Ser. No. 754,730, filed Aug. 22, 1968, now abandoned.

BACKGROUND OF THE INVENTION

This invention relates to the manufacture of granular materials and, more particularly, is concerned with the manufacture of hygroscopic granular materials, for example fertilisers, having a reduced tendency to form cakes.

Almost all solid fertilisers, for example, are now produced as granular materials which are very suitable for use with modern conventional farm machinery provided that the granular material remains in a free-flowing state. During storage of the granular material prior to packaging in bags, and during the storage of the bagged granular material, there is a tendency for the fertiliser to consolidate into hard masses or cakes. This is due to the coalescence of the granules at points of contact. The bond which is formed can be so strong that the resultant mass is entirely unsuitable for use at the agricultural area. With modern fertilisers it is almost always necessary to reduce this tendency to form cakes. A common method of achieving this end lies in the use of various finely divided minerals in which form they are applied to the surfaces of the granules by causing the fertiliser granules to tumble in a drum whilst in contact with the finely divided mineral. The presence of a finely divided mineral on the surface of the granules of a granular material reduces the incidence and extent of the coalescence of the granules. Among the many finely divided minerals, which are known and used for anti-caking, are the kaolinitic clays. Kaolinitic clays extracted from primary occurrences are usually called china-clays and those from secondary or sedimentary deposits are frequently referred to as ball-clays. Both types are used for anti-caking and the order of merit, in terms of their anti-caking properties, of a range of kaolinitic clays is not a constant factor and seems to depend upon such factors as the chemical constitution of the granular material, the surface form of the granules and the moisture content of the granular material.

It is an object of the present invention to provide a method of preparing a granular material having a reduced tendency to form cakes.

SUMMARY OF THE INVENTION

In accordance with the present invention there is provided a method of preparing a solid, granular material having a reduced tendency to form cakes, which method includes the step of mixing with the granular material a minor amount of a finely divided, calcined kaolinitic clay.

Calcination of kaolinitic clays causes the major constituent, kaolinite, to undergo chemical reactions with loss of the elements hydrogen and oxygen to produce chemical compounds which are not chemically or physically identical with kaolinite.

DESCRIPTION OF THE PREFERRED EMBODIMENTS

Preferably, the finely divided, calcined kaolinitic clay comprises at least 40 percent by weight of particles smaller than 2 microns equivalent spherical diameter and less than 0.5 percent by weight of particles larger than a No. 300 mesh British Standard sieve.

The amount of finely divided, calcined kaolinitic clay used is generally in the range of from 0.5 to 2.0 percent by weight, based on the weight of the granular material.

Any kaolinitic clay mineral may be calcined for use in accordance with the present invention. The clay may be pulverised before being fed to the calcination furnace, but preferably it is fed to the calcination furnace in the form of small dry lumps in which case the calcined clay is subsequently ground in a suitable mill in order to secure consistent particle size distribution in the powders. Preferably, the clay mineral fed to the calcination furnace is a high quality, refined china clay consisting of particles smaller than 10 microns equivalent spherical diameter with advantageously about 80 percent by weight smaller than 2 microns. After calcination and pulverisation the resulting anti-caking material preferably has a particle size analysis such that from 50 to 60 percent by weight of the clay is finer than 2 microns.

The calcination of the kaolinitic clay can be effected by heating the kaolinitic clay to a temperature in the range of from 500°C. to 1500°C., the most convenient temperatures being in the range of from 650°C. to 700°C. The period during which the clay is maintained at this temperature is usually about 1 hour, and if, after this time, a sample of the calcined product is heated to 1000°C. for a further hour it is generally found that a further loss in weight, which may vary between 3 percent and nil depending on the original calcination conditions, occurs. The preferred anti-caking material for use in the present invention is that which shows a further loss of about 1% under the heated conditions.

The granular material can be mixed with the finely divided, calcined kaolinitic clay in a conventional manner, for example in a rotating drum.

In a given solid, granular material, the factors which promote caking during storage are high initial moisture contents, ingress of moisture from the atmosphere, ambient temperature variation and the application of pressure at the areas of contact between the granules. This latter factor is the most important as can be seen from the fact that significant and even severe caking often occurs in bags at the bottom of a stack of bags whilst the contents of bags at the top of the stack are completely free flowing. In order to test the anti-caking properties of the finely divided, calcined kaolinitic clay used in the present invention and to compare it with the previously used materials the following test was devised:

Pressure is applied to a quantity of a granular material followed by a measurement of the force required to rupture the resultant caked mass. The pressure is applied by centrifugal forces applied to all granules of an enclosed mass of the granular material. This is to minimise any irregularities of results which might be due to irregular transmission of pressure (particle bridging) when external pressure is applied by external weights acting on quantities of the granular material or is applied pneumatically to flexible containers. More specifically, in the test a quantity of the granular material, for example a fertiliser, is placed in a glass centrifuge bottle and a metal piston is embedded in the mass at a standard location. The bottle is closed to prevent moisture ingress and is spun at constant velocity and radius in a centrifuge for 24 hours. This application of pressure usually causes some degree of caking depending upon the efficiency of any anti-caking material deposited on the granular material. The bottle after removal from the centrifuge is supported, and an increasing rarefactive force is applied to the exposed piston rod until sudden rupture of the caked mass is achieved. The rate of increase of the force follows a fixed schedule and the force being applied at the instant of rupture is taken directly as a measure of cake strength and therefore as a measure of caking propensity. For any particular anti-caking material, several bottle trials are performed and a mean cake-strength is computed.

The invention will now be illustrated by reference to the following Examples which show the efficacy of several anti-caking materials, including a finely divided, calcined kaolinitic clay, when incorporated in various granular materials.

EXAMPLES 1 TO 23

It is common practice to define fertilisers on the basis of their NPK contents, where the letters NPK represent, respectively, Nitrogen (as $N_2$), Phosphorus (as $P_2O_5$) and Potash (as $K_2O$), the proportions, as a percentage by weight, of these constituents in a fertiliser being given in the form %N—%P—%K, e.g. 20—1-0—10 defines a fertiliser containing 20 percent by weight nitrogen (as $N_2$), 10 percent by weight phosphorus (as $P_2O_5$) and 10 percent by weight potash (as $K_2O$). In addition the major source of the nitrogen, which is usually either ammonium nitrate or urea in the modern concentrated fertilisers, is often specified, e.g. 20-10-10 urea defines a fertiliser in which the major source of the 20 percent by weight nitrogen is urea. In the following Tables I, II and III there are summarised the results of tests carried out to determine the anti-caking properties of a calcined kaolinitic clay, as used in the present invention, and of anti-caking materials known heretofore. The cake strengths for each fertiliser are given in terms of the force, in grams weight, required to rupture the cake formed in a centrifuge bottle of the type mentioned above. All the fertilisers were specially produced in that none had had any previous anti-caking treatment. The anti-caking materials were applied to masses of the fertilisers under standard conditions by tumbling the two components in a drum rotated at constant speed about its cylindrical axis for a fixed time. The calcined kaolinitic clay used in all the Examples consisted of particles of which 58 percent were finer than 2 microns, 6 percent were coarser than 10 microns and 0.05 percent were retained on a 300 mesh B.S. sieve.

Table I

All Anti-caking materials applied at 1% by weight loadings

| Ex. No. | Fertiliser | Anti-caking material | | | |
|---|---|---|---|---|---|
| | | None | Ball clay | China clay | Calcined kaolinitic clay |
| | | Cake Strengths (gm) | | | |
| 1 | 20-10-10 Urea 0.7% Moisture | 900 | — | 515 | 315 |
| 2 | 25-0-0 Nitrate 0.4% Moisture | 2,660 | 650 | 550 | 335 |
| 3 | 13-13-20 Nitrate 0.5% Moisture | 1,240 | 365 | 480 | 270 |
| 4 | 14-14-14 Nitrate 0.6% Moisture | 2,325 | 440 | 475 | 390 |
| 5 | 26-0-0 Nitrate 0.2% Moisture | 926 | 514 | 430 | Nil |
| 6 | 20-10-10 Urea 1.6% Moisture | 1,634 | 577 | 560 | 183 |
| 7 | 20-10-10 Urea 1.3% Moisture | 1,515 | 1000 | 708 | 267 |
| 8 | 13-13-20 Nitrate 0.5% Moisture | 920 | 123 | 270 | Nil |
| 9 | 20-10-10 Nitrate 0.6% Moisture | 2,005 | 647 | 735 | 442 |
| 10 | 33.5-0-0 Nitrate 0.3% Moisture | 1,980 | 1036 | 885 | 428 |

It should be noted that increasing the loading on a fertiliser of a given anti-caking material increases, to a certain extent, the protection from caking, but in addition to increasing the total process cost, it also presents further problems, viz:

a. the increase in protection is a diminishing return and is for all practical purposes limited to a maximum loading of 3 percent by weight, since beyond 3 percent cake strengths are not significantly reduced by the use of more anti-caking material;

b. even below the 3 percent level manufacturers often have trouble due to segregation of some of the anti-caking material from the granules of the fertiliser, the surface of some granular constituents of a fertiliser being incapable of a firm retention of the anti-caking material beyond a certain loading, which leads to high dust levels in the factory and segregation of the anti-caking material in the packages after transport; and c. during the operation of distribution machinery at farms there tends to be a mild grinding of the granule surface with the production of a dust composed of the anti-caking material and fertiliser fines which fertiliser fines are very hygroscopic in character so that, under humid conditions, they cause the anti-caking material to become moist and form adherent plastic masses which tend to block the fine clearances in, for example, drill spouts, the problem being exacerbated by high loadings of anti-caking material.

It will be appreciated therefore that it is advantageous to use an anti-caking material which will confer good protection from caking at a relatively low loading. In Table II below there are compared china clay at 2 percent by weight loading and a finely divided calcined kaolinitic clay at 1 percent by weight loading.

Table II

| Example No. | Fertiliser | Anti-caking material | |
|---|---|---|---|
| | | 2% China clay | 1% Calcined kaolinitic clay |
| | | Cake Strength (gm) | |
| 11 | 20-10-10 Urea 0.7% Moisture | 430 | 315 |
| 12 | 13-13-20 Nitrate 0.5% Moisture | 340 | 270 |
| 13 | 26-0-0 Nitrate 0.2% Moisture | 310 | Nil |
| 14 | 20-10-10 Urea 1.6% Moisture | 345 | 183 |
| 15 | 20-10-10 Urea 1.3% Moisture | 533 | 267 |

Table II-Continued

| Example No. | Fertiliser | Anti-caking material | |
|---|---|---|---|
| | | 2% China clay | 1% Calcined kaolinitic clay |
| | | Cake Strength (gm) | |
| 16 | 14-14-14 Nitrate 0.6% Moisture | 320 | 390 |
| 17 | 13-13-20 Nitrate 0.5% Moisture | 133 | Nil |
| 18 | 20-10-10 Nitrate 0.6% Moisture | 420 | 442 |
| 19 | 33.5-0-0 Nitrate 0.3% Moisture | 617 | 428 |

In Table III below there are compared china clay at 1 percent by weight loading and a calcined kaolinitic clay at ½ percent by weight loading.

Table III

| Example No. | Fertiliser | Anti-caking material | |
|---|---|---|---|
| | | 1% China clay | ½% Calcined kaolinitic clay |
| | | Cake Strength (gm) | |
| 20 | 20-10-10 Urea 0.7% Moisture | 515 | 440 |
| 21 | 26-0-0 Nitrate 0.2% Moisture | 430 | 378 |
| 22 | 20-10-10 Urea 1.6% Moisture | 560 | 459 |
| 23 | 20-10-10 Urea 1.3% Moisture | 708 | 606 |

From Tables II and III it can be seen that over the range of loadings commonly employed, viz. 0.5 to 2 percent, the calcined, kaolinitic clay at a given loading is in many cases superior as an anti-caking material to china clay applied at double this loading.

EXAMPLES 24 TO 28

In order to illustrate the effect of the particle size of the calcined kaolinitic clay, five samples of a fertiliser having the composition 13 - 13 - 20 Nitrate and a moisture content of 0.5 percent by weight of water were treated with anti-caking powders each comprising a kaolinitic clay calcined at 680°C. for 1 hour but pulverised to varying degrees of fineness. The degree of fineness of each anti-caking powder was determined by measuring the percentage by weight of particles smaller than 2 microns equivalent spherical diameter (e.s.d.) in the powder. All anti-caking powders were applied at 1 percent by weight loadings.

Each sample of the fertiliser, after being coated with anti-caking powder, was placed in a glass bottle and rotated in the centrifuge for 24 hours at 330 r.p.m., whereafter the force, in grams weight, required to rupture the cake formed in the centrifuge bottle was noted and recorded as a measure of the cake strengths. The results obtained are given in Table IV below.

Table IV

| Example No. | Calcined kaolinitic clay anti-caking material % by wt. smaller than 2 microns e.s.d. | Cake strength (gm) |
|---|---|---|
| 24 | 20 | 521 |
| 25 | 45 | 403 |
| 26 | 58 | 270 |
| 27 | 74 | 230 |
| 28 | 96 | 193 |

It will be noted that the anti-caking properties improve as the degree of fineness of the calcined kaolinitic clay increases, but calcined kaolinitic clay is a hard, lumpy material and therefore much energy must be expended to grind it to a fine powder. For this reason it is preferred to grind the calcined china clay so that it contains not more than 60 percent by weight of particles smaller than 2 microns equivalent spherical diameter.

EXAMPLES 29 AND 30

A sample of explosive grade ammonium nitrate having a moisture content of 0.3 percent by weight of water and a sample of prilled urea suitable for use as a raw material in the manufacture of plastics materials and synthetic chemicals and having a moisture content of 1.4 percent by weight of water were each treated with an anti-caking powder comprising a kaolinitic clay calcined at 680°C. for 1 hour and then pulverised so that 58 percent by weight of particles were finer than 2 microns equivalent spherical diameter, 6 percent by weight were coarser than 10 microns equivalent spherical diameter and 0.05 percent by weight were retained on a 300 mesh B.S. sieve.

The cake strengths of the two materials were measured under the standard conditions described above after the materials had been treated with the anticaking powders at loadings of ½% and 1% by weight. For comparison the cake strengths of the untreated materials were also measured. The results are given in Table V below.

Table V

| Example No. | Material | Cake strengths at loadings of | | |
|---|---|---|---|---|
| | | 0% | ½% | 1% |
| 29 | Ammonium nitrate | 1890 | 595 | 425 |
| 30 | Urea | 1580 | 470 | 215 |

Other granular materials can be treated with a calcined kaolinitic clay in accordance with the present invention to prevent caking and, in general, it has been found that a calcined kaolinitic clay can be used with any hygroscopic granular material.

I claim:

1. A granular hygroscopic fertilizer having anticaking properties wherein the granules of the hygroscopic fertilizer are at least partially coated
  with up to 3 percent by weight of a pulverized calcined kaolin clay which has been obtained by heating a kaoline clay at a temperature in the range of from 500°C to 1500°C for a time such that further heating of said clay for 1 hour at 1000°C would produce a weight loss of not more than 3 percent, wherein at least 40 percent by weight of the clay particles being smaller than 2 microns equivalent spherical diameter.

2. A granular hygroscopic fertilizer as claimed in claim 1 wherein said pulverized calcined kaolin clay contains from 50 to 60 percent by weight of particles smaller than 2 microns equivalent spherical diameter.

3. A granular hygroscopic fertilizer as claimed in claim 1 wherein the powdered calcined kaolin clay is prepared from a china clay consisting of particles smaller than 10 microns equivalent spherical diameter.

4. A granular hygroscopic fertilizer as claimed in claim 1 wherein the powdered calcined kaolin clay is prepared by heating a kaolin clay to a temperature in the range of from 650°C to 700°C for about 1 hour.

5. A granular hygroscopic fertilizer as claimed in claim 1 wherein said hygroscopic fertilizer is at least partially coated with up to 3 percent by weight of a calcined china clay.

6. A granular hygroscopic fertilizer as claimed in claim 1 wherein said pulverized calcined kaolin clay contains less than 0.5 percent by weight of particles of a size such that they would be retained on a number 300 mesh British Standard Sieve.

7. A granular hygroscopic fertilizer as claimed in claim 1 wherein the granules of the hygroscopic fertilizer are coated with from 0.5 to 2.0 percent by weight of the pulverized calcined kaolin clay.

8. A granular hygroscopic fertilizer as claimed in claim 1 wherein said fertilizer contains a nitrogen containing compound selected from the group consisting of urea and ammonium nitrate.

* * * * *